(12) United States Patent
Asper

(10) Patent No.: US 12,083,837 B2
(45) Date of Patent: Sep. 10, 2024

(54) NONPNEUMATIC TIRE HAVING MULTIPLE SHEAR HOOPS

(71) Applicant: Bridgestone Americas Tire Operations, LLC, Nashville, TN (US)

(72) Inventor: Robert W. Asper, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 656 days.

(21) Appl. No.: 17/273,166

(22) PCT Filed: Sep. 25, 2019

(86) PCT No.: PCT/US2019/052946
§ 371 (c)(1),
(2) Date: Mar. 3, 2021

(87) PCT Pub. No.: WO2020/076507
PCT Pub. Date: Apr. 16, 2020

(65) Prior Publication Data
US 2021/0323351 A1 Oct. 21, 2021

Related U.S. Application Data
(60) Provisional application No. 62/743,092, filed on Oct. 9, 2018.

(51) Int. Cl.
*B60C 7/10* (2006.01)
*B60C 7/00* (2006.01)
*B60C 7/14* (2006.01)

(52) U.S. Cl.
CPC .................. *B60C 7/10* (2013.01); *B60C 7/00* (2013.01); *B60C 7/102* (2013.01); *B60C 7/146* (2021.08)

(58) Field of Classification Search
CPC .. B60C 7/00; B60C 7/08; B60C 7/102; B60C 7/146; B60C 7/18
(Continued)

(56) References Cited

U.S. PATENT DOCUMENTS 2,943,663 A 7/1960 Antonson
8,491,981 B2 7/2013 Delfino et al.
(Continued)

FOREIGN PATENT DOCUMENTS

CN 204149777 U * 2/2015
FR 3035616 11/2016
(Continued)

OTHER PUBLICATIONS

Iino Y, JP-2018039479-A, machine translation. (Year: 2018).*
(Continued)

*Primary Examiner* — Sedef E Paquette
(74) *Attorney, Agent, or Firm* — Shaun J. Fox; Bryan J. Jaketic

(57) ABSTRACT

A nonpneumatic tire includes an annular outer surface, an annular inner surface, and a webbing extending from the annular outer surface to the annular inner surface. The nonpneumatic, tire also includes a plurality of shear elements extending circumferentially around the annular outer surface and spaced laterally apart from each other. Each shear element includes a substantially inelastic lower region, a substantially inelastic upper region, and an elastic region disposed between the substantially inelastic lower region and the substantially inelastic upper region. The nonpneumatic tire further includes a tread layer extending circumferentially around the plurality of shear elements.

16 Claims, 5 Drawing Sheets

(58) Field of Classification Search
USPC .......................................................... 152/300
See application file for complete search history.

(56) References Cited

U.S. PATENT DOCUMENTS

| | | | | |
|---|---|---|---|---|
| 2009/0283185 | A1* | 11/2009 | Manesh | .................... B60C 7/22 |
| | | | | 152/11 |
| 2011/0104428 | A1 | 5/2011 | Delfino et al. | |
| 2012/0241062 | A1 | 9/2012 | Manesh et al. | |
| 2012/0318417 | A1 | 12/2012 | Dotson et al. | |
| 2014/0367007 | A1 | 12/2014 | Thompson | |
| 2015/0328936 | A1 | 11/2015 | Colby et al. | |
| 2016/0167440 | A1 | 6/2016 | Schweitzer et al. | |
| 2016/0200145 | A1 | 7/2016 | Asper | |
| 2016/0288576 | A1 | 10/2016 | Romero et al. | |
| 2016/0339745 | A1 | 11/2016 | North et al. | |
| 2017/0113491 | A1 | 4/2017 | Iwamura et al. | |
| 2017/0368879 | A1* | 12/2017 | Lettieri | .................... B60C 7/22 |
| 2019/0070903 | A1* | 3/2019 | Tsuji | ........................ B60C 7/14 |

FOREIGN PATENT DOCUMENTS

| | | |
|---|---|---|
| JP | 04306103 | 10/1992 |
| JP | H108506549 | 7/1996 |
| JP | 2006103397 | 4/2006 |
| JP | 2008222038 | 9/2008 |
| JP | 2011037415 | 2/2011 |
| JP | 2011515261 | 5/2011 |
| JP | 4872273 | 2/2012 |
| JP | 2012240525 | 12/2012 |
| JP | 2015081010 | 4/2015 |
| JP | 6014043 | 10/2016 |
| JP | 2017509521 | 4/2017 |
| JP | 201781198 | 5/2017 |
| JP | 2018039479 A * | 3/2018 |
| KR | 20090050338 | 5/2009 |
| KR | 10-2012-0070469 | 6/2012 |
| KR | 1486749 | 1/2015 |
| WO | 2013095499 | 6/2013 |
| WO | 2018125186 | 7/2018 |

OTHER PUBLICATIONS

Yang Y, CN-204149777-U, machine translation. (Year: 2015).*
Written Opinion and international search report; Corresponding PCT application PCT/US2019/052946: Authorized officer Hwang, Chan Yoon: Date of mailing Jan. 15, 2020.
Search Report; Corresponding EP application 19871691: Authorized officer Wolfgang Jung; Date of mailing Jun. 15, 2022.

* cited by examiner

NONPNEUMATIC TIRE HAVING MULTIPLE SHEAR HOOPS

FIELD OF INVENTION

The present disclosure relates to a nonpneumatic tire. More particularly, the present disclosure relates to an airless tire having a circumferential tread with multiple shear hoops.

BACKGROUND

Airless, or nonpneumatic tires known in the art include a web, spokes or spoke rings each having the same stiffness and the same diameter. The prior art web or spokes buckle or deflect upon contact with the ground, and create a contact patch shape with substantially straight leading and trailing edges. The prior art web or spokes may be constructed of a material that is relatively stronger in tension than in compression, such that when the lower web or spokes buckle, the load can be distributed through the remaining portion of the wheel. This disclosure uses the term web or spokes interchangeably to refer to the material connecting the wheel to the shear band.

Nonpneumatic tires may have a circumferential tread that has a variety of grooves and a variety of materials. Certain nonpneumatic tires include a shear element disposed beneath the tread. The shear element includes an elastic region disposed between a pair of substantially inelastic regions. The shear band can carry a portion of the load on the tire and the flexibility of the shear element may be selected to result in a desired footprint behavior and traction mobility of the tire. Such a shear element may extend axially beneath the entire tread.

SUMMARY

In one embodiment, a nonpneumatic tire includes a plurality of spoke rings. Each of the plurality of spoke rings has an annular outer surface, an annular inner surface, and a plurality of spokes extending between the annular outer surface and the annular inner surface. The nonpneumatic tire further includes a plurality of shear elements, each shear element corresponding to one of the plurality of spoke rings. Each shear element extends circumferentially around the annular outer surface of a corresponding spoke ring. Each shear element includes a substantially inelastic lower region, a substantially inelastic upper region, and an elastic region disposed between the substantially inelastic lower region and the substantially inelastic upper region. The nonpneumatic tire also includes a tread layer extending circumferentially around the plurality of shear elements.

In another embodiment, a nonpneumatic tire includes an annular outer surface, an annular inner surface, and a webbing extending from the annular outer surface to the annular inner surface. The nonpneumatic tire also includes a plurality of shear elements extending circumferentially around the annular outer surface and spaced laterally apart from each other. Each shear element includes a substantially inelastic lower region, a substantially inelastic upper region, and an elastic region disposed between the substantially inelastic lower region and the substantially inelastic upper region. The nonpneumatic tire further includes a tread layer extending circumferentially around the plurality of shear elements.

In yet another embodiment, a nonpneumatic tire includes an annular outer surface, an annular inner surface, and support structure extending from the annular outer surface to the annular inner surface. The nonpneumatic tire further includes a circumferential tread having a plurality of circumferential ribs and a plurality of circumferential grooves, including a first circumferential rib having a first rib width defined by a first circumferential groove and a second circumferential groove. The first circumferential rib includes a reinforcing layer having a width less than the first rib width, such that the reinforcing layer is enclosed by the first circumferential rib. A top surface of the reinforcing layer is located radially above a bottom of the first circumferential groove and radially above a bottom of the second circumferential groove.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Tread" refers to that portion of the tire that comes into contact with the road under normal inflation and load.

Figure 1:
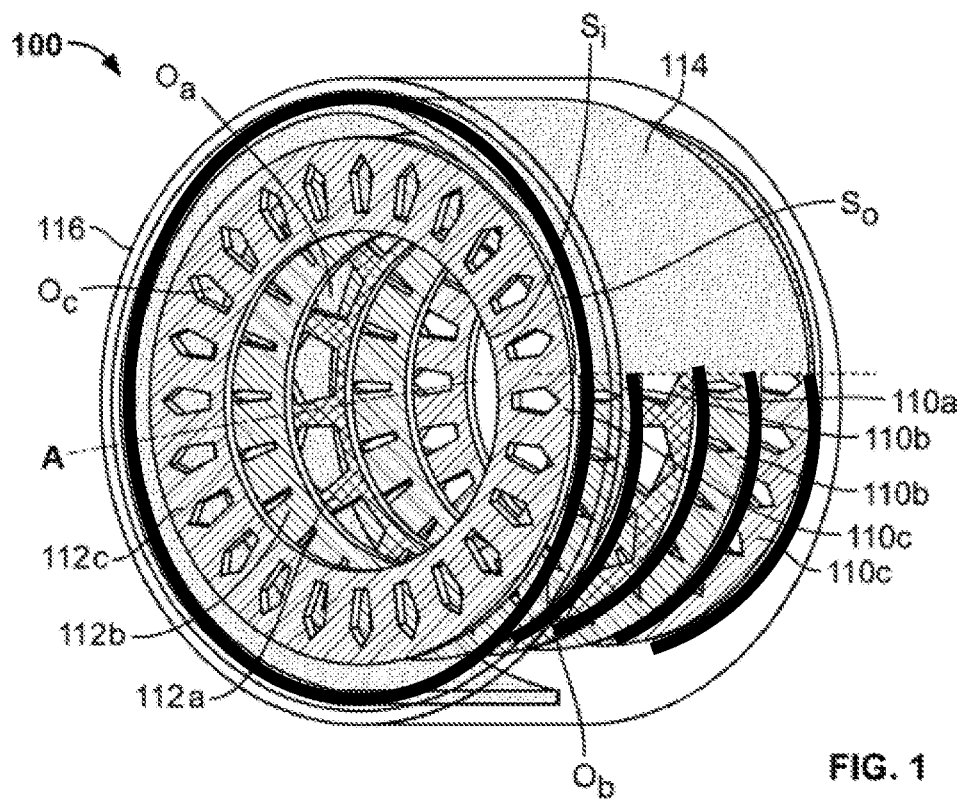
FIG. 1 is a schematic drawing showing a perspective view of one embodiment of a nonpneumatic tire 100 having multiple spoke rings.

FIG. 1 illustrates one embodiment of a nonpneumatic tire 100 having an axis of rotation A passing through its center. Nonpneumatic tire 100 is constructed of five spoke rings 110, including a central spoke ring 110a, a pair of intermediate spoke rings 110b disposed on each side of the central spoke ring 110a, and a pair of outer spoke rings 110c disposed on either side of intermediate spoke rings 110b. Each of the spoke rings 110 includes a plurality of spokes 112. While five spoke rings are shown in the illustrated embodiment, it should be understood that the nonpneumatic tire 100 is not limited to any particular number of spoke rings, and may alternatively utilize structures other than spoke rings, such as a unitary structure having a plurality of spokes. The spoke rings 110 may be constructed of materials including, without limitation, corded carbon-filled rubber, nylon, polyester, fibers (glass, aramid, etc.) with resin, thermoplastic, or urethane.

Each spoke ring 110 each has an inner annular surface $S_I$ and an outer annular surface $S_O$ that defines an inner diameter and a maximum outer diameter, respectively. In the illustrated embodiment, the maximum outer diameters of all five spoke rings 110 are equal. In alternative embodiments, the maximum outer diameters of the spoke rings may vary.

In the illustrated embodiment, each spoke 112 extends from the inner annular surface $S_I$ to the outer annular surface $S_O$ of the respective spoke ring 110. The spokes 112 define openings $O_S$ between one another. For illustrative purposes, the openings $O_S$ are shown as pentagon-shaped. However, it should be understood that the openings $O_S$ may have any geometric shape. In an alternative embodiment (not shown), the spokes may form a more complex webbing rather than extend from the inner annular surface $S_I$ to the outer annular surface $S_O$. In another alternative embodiment (not shown), at least one of the spokes extends from an annular inner surface of a first spoke ring to an annular outer surface of a second spoke ring.

Each spoke ring 110 has a stiffness k. As one of ordinary skill in the art would understand, the stiffness of a spoke ring may be defined by a number of factors, including, without limitation, the material of the spoke ring and the geometry of the spokes and openings. Spoke rings with a higher stiffness are more resistant to deformation and compression. In one embodiment, each of the spoke rings have the same stiffness k. In alternative embodiments, one or more spoke rings may have different stiffnesses. For example, in one embodiment, a central spoke ring 110a has a first stiffness $k_a$, intermediate spoke rings 110b each have substantially the same second stiffness $k_b$, and outer spoke rings 110c each have substantially the same third stiffness $k_c$. In such an embodiment, the second stiffness $k_b$ may be greater than the first stiffness $k_a$, and the third stiffness $k_c$ may be greater than both the first stiffness $k_a$ and the second stiffness $k_b$. In an alternative embodiment, the first stiffness $k_a$ is greater than both the second stiffness $k_b$ and the third stiffness $k_c$, and the second stiffness $k_b$ is greater than the third stiffness $k_c$. In another alternative embodiment, the second stiffness $k_b$ is greater than both the first stiffness $k_a$ and the third stiffness $k_c$, and the third stiffness $k_c$ is greater than the first stiffness $k_a$.

With continued reference to FIG. 1, the central spoke ring 110a is shown as having a relatively lower number of spokes 112a, with the spokes 112a being separated by relatively larger openings $O_a$. As one of ordinary skill in the art would understand, this geometry would result in a relatively low first stiffness $k_a$. This low first stiffness $k_a$ may be achieved by other means, such as with the use of different materials, construction methods, or geometries.

Intermediate spoke rings 110b are shown as having more spokes 112b than central spoke ring 110a. The spoke openings $O_b$ of intermediate spoke rings 110b are narrower than spoke openings $O_a$ located within central spoke ring 110a. Additionally, spokes 112b of intermediate spoke rings 110b are thicker than spokes 112a of central spoke ring 110a. Both intermediate spoke rings 110b have the same geometry and the same stiffness $k_b$. One of ordinary skill in the art would understand that this geometry would result in a relatively higher stiffness $k_b$ than the central spoke ring stiffness $k_a$. Alternatively, the intermediate stiffness $k_b$ of spoke rings 110b may be achieved by other means, such as with the use of different materials, construction methods, or geometries for intermediate spoke rings 110b.

Outer spoke rings 110c are shown in FIG. 1 as having more spokes 112c than intermediate spoke ring 110b, with spokes 112c being separated by relatively larger openings $O_c$ than those of the intermediate spoke ring openings $O_b$. In this embodiment, both outer spoke rings 110c have the same spoke geometry, and the same stiffness $k_c$. One of ordinary skill in the art would understand that the geometry of the outer spoke rings 110c and the larger relative size of the outer spoke ring openings $O_c$ would cause the outer spoke rings 110c to have a lower stiffness than intermediate spoke rings 110b. Alternatively, the stiffness of outer spoke rings 110c may be achieved by other means, such as with the use of different materials, construction methods, or geometries for spoke rings 110c.

In the illustrated embodiment, the five spoke rings 110 have three different stiffnesses. In the illustrated embodiment, the intermediate spoke rings 110b have the highest stiffness, and the central spoke ring 110a has the lowest stiffness. It should be understood that any number of spoke rings having any number of different stiffnesses may be selected. After the stiffnesses of the spoke rings have been selected, the spoke rings are arranged in a desired manner, suitable to a particular application. For example, the stiffness of each ring may be selected to produce a tire having desired characteristics, such as low noise, low vibrations, or low rolling resistance.

When nonpneumatic tire 100 is placed in contact with the ground in a load-bearing condition, nonpneumatic tire 100 contacts the ground to form a tire contact patch shape (not shown in FIG. 1). Because the nonpneumatic tire contact patch shape will be dictated by the stiffness of the spoke rings 110, in addition to other factors, a design engineer can alter the contact patch shape of the nonpneumatic tire by varying the stiffness of the spoke rings 110 across the width of the nonpneumatic tire. This could be done to produce a curved leading edge of the contact patch shape that is desirable when concerned with ride harshness and impact isolation. Further stiffness changes can be used to optimize the contact patch shape for off-highway tires, reducing soil compaction, a key design parameter for certain applications.

FIG. 1 depicts the spokes 112 of corresponding like spoke rings 110 being arranged in alignment with one another. For example, the spokes 112c and openings $O_c$ of each outer spoke ring 110c are aligned with each other, and the spokes 112b and openings $O_b$ of each intermediate spoke ring 110b are aligned with each other. In an alternative embodiment, the spokes 112 and openings $O_S$ of corresponding like spoke rings are not in alignment with each other. It will be apparent to one of ordinary skill in the art that various alignments of spoke rings 110 will cause nonpneumatic tire 100 to have different performance properties. When spoke rings 110 are not aligned with each other, spokes 112 of similar spoke rings 110 enter the contact patch shape area at a different time when nonpneumatic tire 100 is rolling. The spoke rings 110 may also be aligned such that each spoke 112 of the all spoke rings 110 enters the contact patch area at a different time when nonpneumatic tire 100 is rolling. One of ordinary skill in the art would be able to select an alignment providing desired performance properties in any particular application.

After the spoke rings 110 are arranged in a desired manner, they are affixed to a hub (not shown), using known affixing means. Exemplary affixing means include, without limitation, welding, brazing, and the application of adhesive. In one embodiment, the spoke rings 110 are also chemically bonded to each other. For example, the spoke rings may be bonded to each other by welding, brazing, or with the application of an adhesive. In an alternative embodiment, the spoke rings contact each other, but are not directly bonded to each other. In another an alternative embodiment, one or more of the spoke rings are spaced apart.

A plurality of high annular strength shear hoops 114 are circumferentially attached about the spoke rings 110. In the illustrated embodiment, one shear hoop 114 is attached to each spoke ring 110. In an alternative embodiment (not shown), shear hoops are attached to less than all of the spoke rings. In another alternative embodiment (not shown), one or more spoke rings have multiple shear hoops attached thereto.

The high annular strength shear hoops act as a structural compression member on the nonpneumatic tire 100, and increases interlaminar shear strength across the axial length of the nonpneumatic tire 100. Each of the high annular strength shear hoops 114 could include an elastic center portion, sandwiched between two inelastic outer portions, or be composed of a single composite structure (see prior art U.S. Pat. No. 5,879,484).

In the illustrated embodiment, the width of each shear hoop 114 is equal to the axial width of the corresponding spoke ring 110. In an alternative embodiment, the width of the shear hoops may be less than or greater than the axial width of the corresponding shear hoop. In embodiments where the shear hoop 114 has a width less than a width of the corresponding spoke ring 110, additional space is formed. This additional space allows for water evacuation, snow or mud clearing, or other functions. For example, retractable structures such as snow tire studs may be employed in the spacing between the shear hoops.

In one embodiment, all of the shear hoop 114 have the same dimensions. In an alternative embodiment, one or more of the shear hoops may have different dimensions.

In one embodiment, the shear hoops 114 are axially spaced apart from each other in the assembled nonpneumatic tire 100. The spacing and dimensions of the shear hoops may be selected to result in a desired footprint behavior and traction mobility of the tire.

A tire tread 116 is then wrapped about the high annular strength band 114. The tire tread 116 may include elements, such as ribs, block, lugs, grooves, and sipes as desired to improve the performance of the tire in various conditions. In one embodiment, each shear hoop 114 helps define a rib in the circumferential tread, and the spacing between each shear hoop helps define a groove. By using shear hoops to define the ribs in the circumferential tread, less tread skid is required to form the tread.

Figure 2:
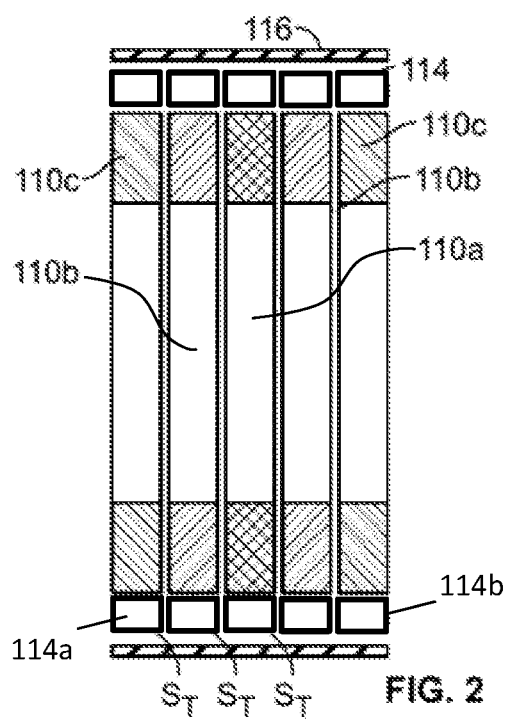
FIG. 2 is a schematic drawing illustrating a cross-section of the nonpneumatic tire 100.

FIG. 2 shows a cross-section of nonpneumatic tire 100. As can be seen from this view, each spoke ring 110 of nonpneumatic tire 100 has the same thickness $S_T$. In alternative embodiments (not shown), the spoke ring thickness of spoke rings may vary. By varying thicknesses $S_T$, the contact patch shape created by nonpneumatic tire 100 may be adapted to suit a wide range of applications, including agricultural and passenger applications.

Additionally, as can be seen in this view, each of the shear hoops 114 is constructed of an elastic central region 114a disposed upper and lower regions 114b that are substantially inelastic. In the illustrated embodiment, the upper and lower regions 114b are formed by a single layer of material that is wrapped around the elastic central region 114a. In an alternative embodiment, separate upper and lower layers are employed.

In other alternative embodiments, one or more additional substantially inelastic layers may be employed to divide the elastic central region into two or more elastic regions. For example, a central layer of substantially inelastic material may be employed to define an upper elastic region and a lower elastic region.

Figure 3:
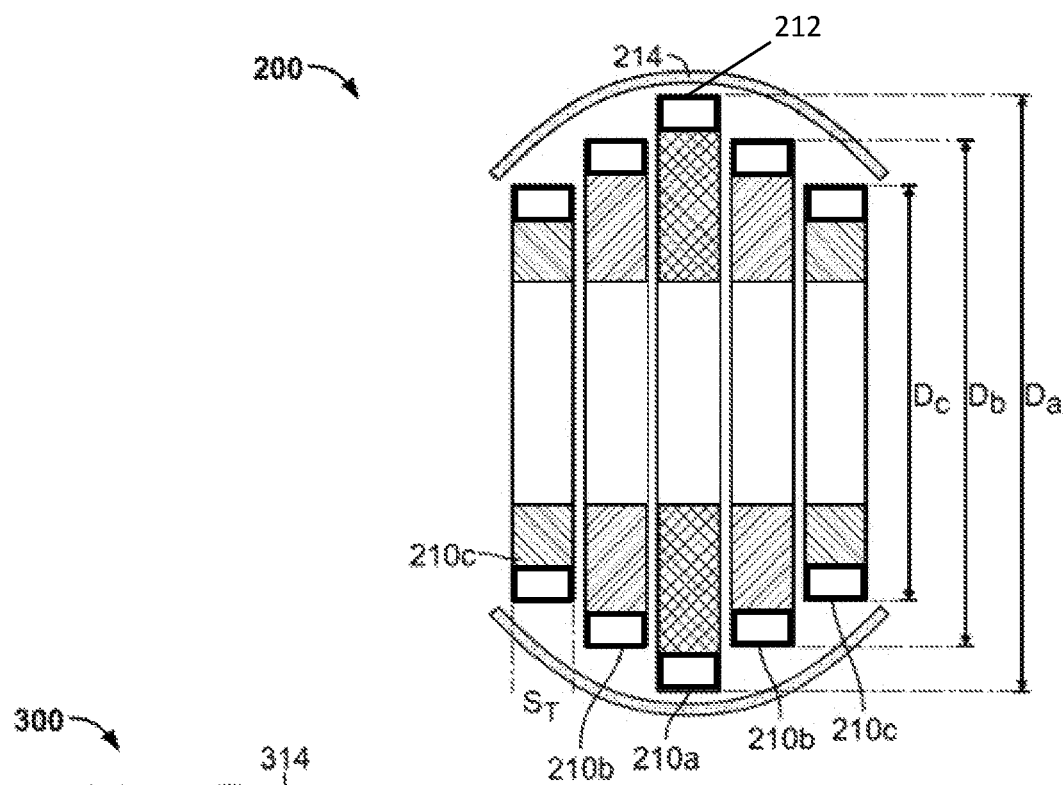
FIG. 3 is a schematic drawing illustrating a cross-section of an alternative embodiment of a nonpneumatic tire having multiple spoke rings of varying diameter, stiffness, and thickness.

FIG. 3 illustrates a cross section of an alternative embodiment of a nonpneumatic tire 200. In this embodiment, spoke rings 210 have different maximum outer diameters and different stiffnesses k. The spoke rings 210 in this embodiment have inner diameters $D_I$ that are substantially the same. Each spoke ring 210 may have a unique stiffness k, or may have a common stiffness k with one or more other spoke rings 210. In this embodiment, central spoke ring 210a has a first stiffness $k_a$, intermediate spoke rings 210b each have a second stiffness $k_b$, and outer spoke rings 210c each have a third stiffness $k_c$. In one embodiment, the first stiffness $k_a$ is lower than both the second stiffness $k_b$ and the third stiffness $k_c$. Additionally, the second stiffness $k_b$ is lower than the third stiffness $k_c$. In an alternative embodiment, the first stiffness $k_a$ is greater than both the second stiffness $k_b$ and the third stiffness $k_c$, and the second stiffness $k_b$ is greater than the third stiffness $k_c$. In another alternative embodiment, the second stiffness $k_b$ is greater than both the first stiffness $k_a$ and the third stiffness $k_c$, and the third stiffness is greater than the first stiffness $k_a$.

Each spoke ring 210 may have a unique outer diameter, or may have a common outer diameter with one or more other spoke rings 210. In the illustrated embodiment, central spoke ring 210a has a first maximum outer diameter $D_a$, intermediate spoke rings 210b each have a second maximum outer diameter $D_b$, and outer spoke rings 210c each have a third maximum outer diameter $D_c$. The first maximum outer diameter $D_a$ is greater than the second maximum outer diameter $D_b$, which in turn is greater than the third maximum outer diameter $D_c$. It should be understood that any number of spoke rings having any number of different outer diameters may be employed. After the outer diameters of the spoke rings have been selected, the spoke rings are arranged in a desired manner, suitable to a particular application. For example, the outer diameter of each ring may be selected to produce a tire having desired characteristics, such as low noise, low vibrations, or low rolling resistance.

Use of variable diameter spoke rings allows for a curved or toroidal band (or shear band) to be used in this type of nonpneumatic tire ("NPT") design. The toroidal band allows additional deflection needed to maximize tire contact patch area. This is especially important for off-highway or agricultural tires which need a contact patch shape with a greater area to minimize soil compaction.

In the illustrated embodiment, each spoke ring 210 has a constant outer diameter. In alternative embodiments (not shown), the spoke rings may have variable outer diameters. For example, the outer diameter of each spoke ring may vary in the axial direction, such that when the spoke rings are assembled, the assembly has a smooth, curved outer surface. Each spoke ring 210 may have a unique thickness, or may have a common thickness $S_T$ with one or more other spoke rings 210.

A plurality of high annular strength shear hoops 212 are circumferentially attached about the spoke rings 210. The high annular strength shear hoops 212 are substantially the same as the shear hoops 114 described above, with respect to FIGS. 1 and 2, including the possible alternative embodiments described above. Tread 214 is wrapped around the outer surfaces of spoke rings 210 and shear hoops 212.

Figure 4:
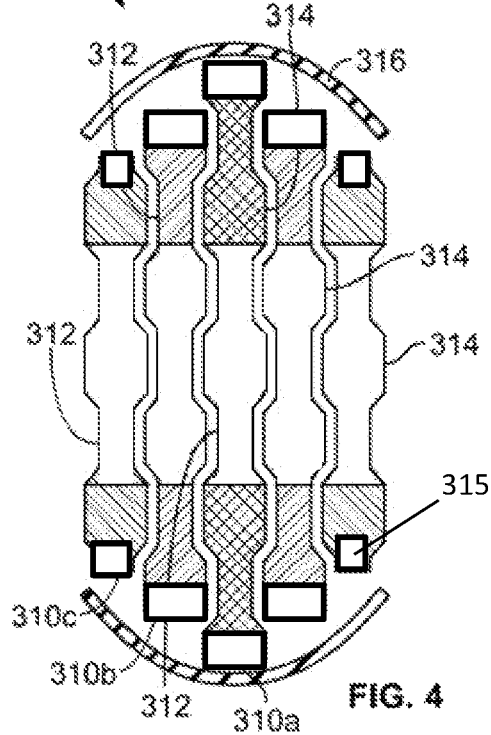
FIG. 4 is a schematic drawing illustrating a cross-section of another alternative embodiment of a nonpneumatic tire having multiple spoke rings of varying diameter, stiffness, and thickness, with each spoke ring having convex and concave portions.

FIG. 4 illustrates a cross section of another alternative embodiment of a nonpneumatic tire 300. The tire 300 is substantially similar to the tire 200 discussed above, except for the differences identified below.

In this embodiment, each spoke ring 310 has concave portions 312 and convex portions 314 that alternate along the sides of spoke rings 310. When aligned, the concave portions 312 and convex portions 314 of adjacent spoke rings 310 abut each other, as seen in FIG. 4. This configuration may provide increased rigidity and support among the spoke rings 310. Alternatively, spoke rings 310 may include other structures that adjoin to one another, such as protrusions in one spoke ring and depressions to receive the protrusions in another spoke ring.

A plurality of high annular strength shear hoops 315 are circumferentially attached about the spoke rings 310. The high annular strength shear hoops 315 are substantially the same as the shear hoops 114 and 212 described above, with respect to FIGS. 1-3, including the possible alternative embodiments described above. Tread 316 circumferentially surrounds spoke rings 310 and shear hoops 315.

Figure 5:
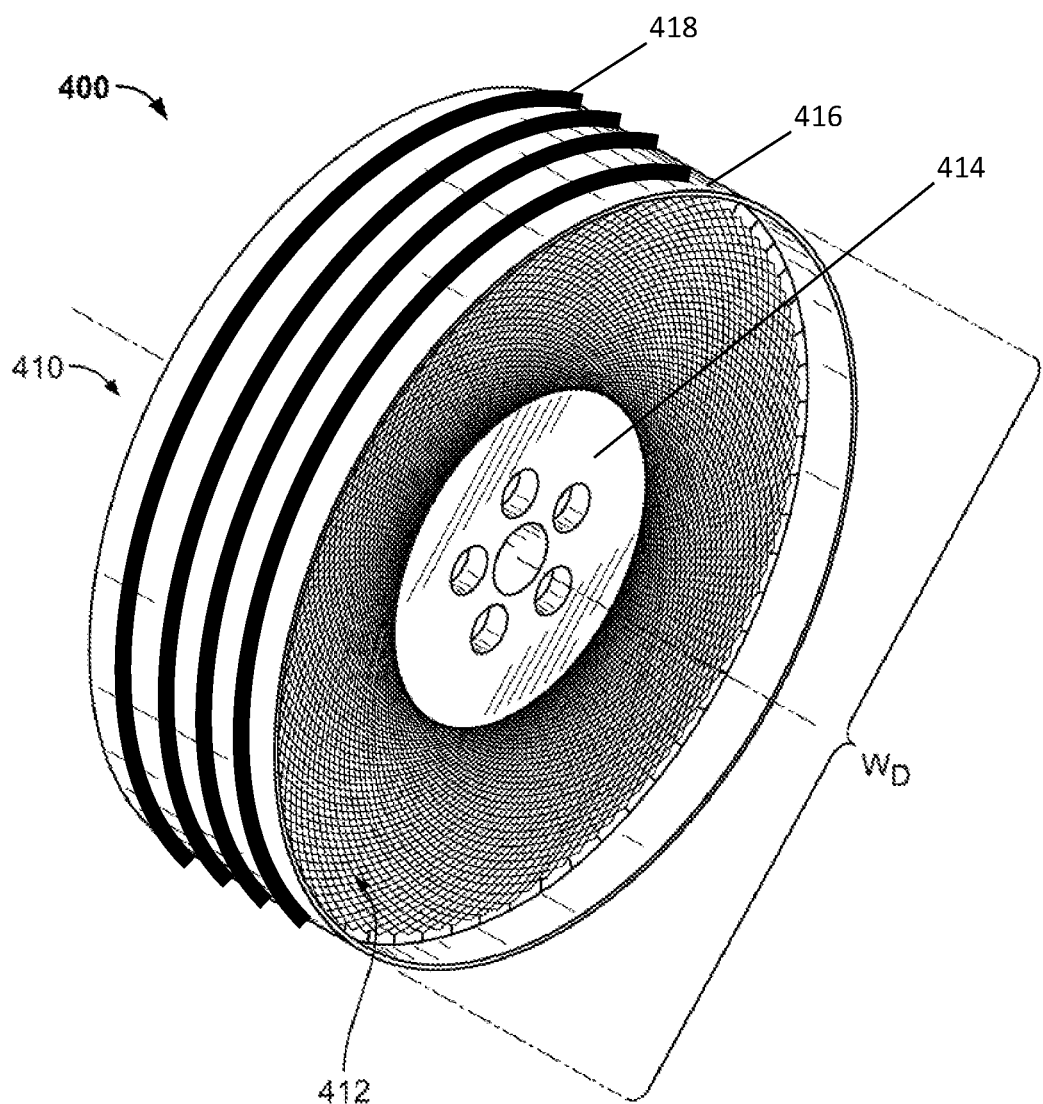
FIG. 5 is a perspective view of still another alternative embodiment of a nonpneumatic tire, having a unitary wheel portion and webbing.

FIG. 5 illustrates a perspective view of yet another alternative embodiment of a nonpneumatic tire 400. In the illustrated embodiment, the nonpneumatic tire 400 has a single wheel portion 410. Wheel portion 410 may be a single unitary structure, or may be made up of a plurality of spoke rings 110 fused together. Wheel portion 410 has a webbing 412 instead of spokes that extend from an inner annular surface to an outer annular surface. The webbing 412 may be any pattern or shape sufficient to provide support. The maximum outer diameter $W_D$ of wheel portion 410 may vary along an axial direction. For example, the maximum outer diameter may be greater in an equatorial plane and smaller towards the sides of nonpneumatic tire 400.

The stiffness k of the webbing portion 412 may vary along an axial direction of wheel portion 410. A varying stiffness k throughout wheel portion 410 can be achieved in several ways. In one embodiment, several spoke rings 110 having various stiffnesses k are fused together. In an alternative embodiment, different materials are used in the wheel portion 410 during manufacture to create pre-stresses within the wheel portion. In another alternative embodiment, the webbing has varying geometry in an axial direction, which causes the stiffness to vary in the axial direction. The webbing geometry may be varied through molding or machining processes, or by a 3D printing or additive manufacturing process. Those of ordinary skill in the art will understand that other methods known in the art may be used to provide a varying axial stiffness within wheel portion 410.

In the embodiment shown in FIG. 5, a hub 414 is affixed to the center of webbing 412 using known affixing means. Exemplary affixing means include, without limitation, welding, brazing, and the application of adhesive. The hub 414 can be attached to a vehicle in a similar manner as a wheel in a conventional tire. In other embodiments, additional webbing 412 can be used instead of the hub 414.

The webbing 412 also extends to an annular outer surface 416. In the illustrated embodiment, the annular outer surface 412 is a single cylinder. In an alternative embodiment (not shown), the annular outer surface may be formed by a plurality of spaced apart hoops. In such an embodiment, the webbing may be similarly divided into spaced apart layers. Alternatively, the webbing may extend between the spaces defined by the spaced apart hoops.

A plurality of high annular strength shear hoops 418 are circumferentially attached about the annular outer surface 416. The high annular strength shear hoops 418 are substantially the same as the shear hoops 114, 212, 315 described above, with respect to FIGS. 1-4, including the possible alternative embodiments described above. A tread layer (not shown) circumferentially surrounds the annular outer surface 416 and shear hoops 418.

Figure 6:
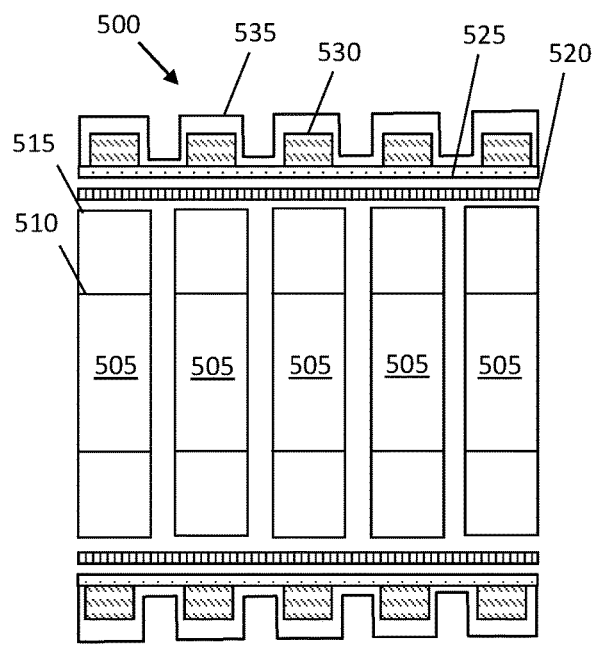
FIG. 6 is a schematic drawing illustrating a partially exploded cross-section of another alternative embodiment of a nonpneumatic tire.

FIG. 6 is a schematic drawing illustrating a partially exploded cross-section of another alternative embodiment of a nonpneumatic tire 500. The nonpneumatic tire 500 includes a plurality of spoke rings 505. In an alternative embodiment, a webbing or other support structure is used instead of spoke rings. The spoke rings 505 extend from an annular inner surface 510 to an annular outer surface 515. A pair of reinforcement plies 520, 525 are disposed about the annular outer surface 515. The reinforcement plies may be steel belts or corded plies. Corded plies may be nylon or other polymeric cords encased in a rubber skim layer.

A plurality of spaced apart reinforcing layers 530 are disposed about the upper reinforcement ply 525. A tread layer 535 is disposed about the spaced apart reinforcing layers 530, thereby forming a plurality of ribs spaced apart by circumferential grooves.

Each reinforcing layer 530 has a width that is less than the corresponding rib width. Thus, each reinforcing layer 530 is enclosed by the correspond circumferential rib. While the reinforcing layers 530 are shown as being substantially centered within the each circumferential rib, in alternative embodiments, the reinforcing layer may be skewed to the right or left. In another alternative embodiment (not shown), the reinforcing layer may undulate within the rib in the circumferential direction, so that it is centered at some locations, skewed to left at some locations, and skewed to the right at other locations.

In the illustrated embodiment, each reinforcing layer 530 also has a width less than a width of a corresponding spoke ring 505. The difference in widths creates space that allows for water evacuation, snow or mud clearing, or other functions. For example, retractable structures such as snow tire studs may be employed in the spacing between the shear hoops.

In the illustrated embodiment, each reinforcing layer 530 has the same gauge G along its entire lateral width. A top surface of the reinforcing layer is located radially higher than a bottom of the first circumferential groove due to the curvature of the tread. Additionally, the reinforcing layer 530 has the same gauge G along its entire circumferential length. In alternative embodiments (not shown), the gauge G of the reinforcement varies in the lateral or circumferential direction.

As can be further seen in FIG. 6, no part of the reinforcing layer 530 extends directly below a bottom surface of any of the plurality of circumferential grooves. A top surface of each reinforcing layer 530 is located radially higher than the bottom surface of each of the plurality of circumferential grooves. In an alternative embodiment (not shown), the top surface of the reinforcing layer 530 may be lower than the bottom surface of the circumferential groove.

In the illustrated embodiment, no part of the reinforcing layer 530 forms a groove wall surface of any of the plurality of the circumferential grooves. In this specific embodiment, no part of the reinforcing layer 530 forms a radially outer surface of any of the plurality of the circumferential ribs. In an alternative embodiment (not shown), a portion of the reinforcing layer 530 may form a radially outer surface of at least one of the circumferential ribs. For example, the reinforcing layer may become exposed as the tread wears.

In one embodiment, each reinforcing layer 530 includes a reinforcing cord. The reinforcing cord can be a circumferentially extended cord. The reinforcing cord may be an organic cord, for example a nylon cord, or a metal cord, for example a steel cord. In one particular embodiment, the reinforcing cords are limited to the reinforcing layer, and no reinforcing cords (i.e., no organic cords) are disposed radially between the carcass and the bottom surfaces of the plurality of the circumferential grooves.

In one embodiment, each reinforcing layer includes a matrix rubber embedding the reinforcing cord. A tread rubber disposed radially above the reinforcing layer is a different rubber material from the matrix rubber. The matrix rubber may have a higher modulus than that of the tread rubber. Alternatively, the matrix rubber may have a lower modulus than that of the tread rubber.

The tread rubber 535 forms the bottoms of the plurality of the circumferential grooves. In one embodiment, the tread rubber is made of a single rubber material. Alternatively, the tread rubber may include multiple rubber layers made of different rubber materials.

The use of the reinforcing layers 530 results in ribs having a groove depth that is greater than the gauge of the tread material 535.

Figure 7:
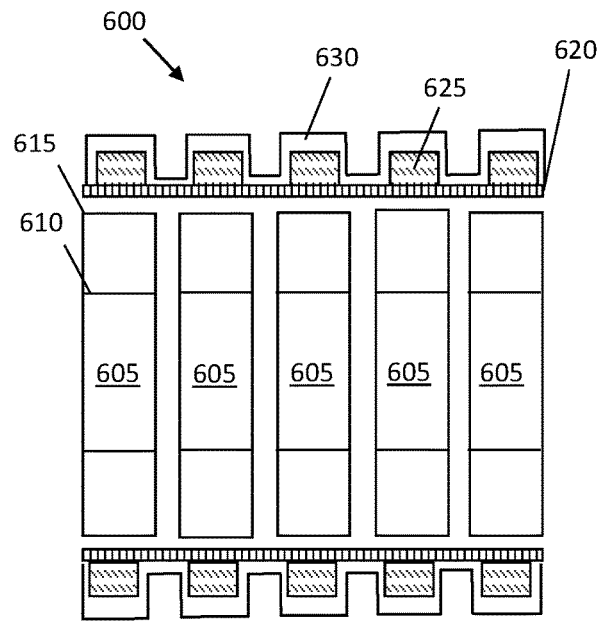
FIG. 7 is a schematic drawing illustrating a partially exploded cross-section of yet another alternative embodiment of a nonpneumatic tire.

FIG. 7 is a schematic drawing illustrating a partially exploded cross-section of yet another alternative embodiment of a nonpneumatic tire 600. The tire 600 is substantially the same as the tire 500 shown in FIG. 6 and discussed above (including the alternative embodiments discussed above), except for the differences described herein.

In the illustrated embodiment, the nonpneumatic tire 600 includes a plurality of spoke rings 605. In an alternative embodiment, a webbing or other support structure is used instead of spoke rings. The spoke rings 605 extend from an annular inner surface 610 to an annular outer surface 615. A single reinforcement ply 620 is disposed about the annular outer surface 615. The reinforcement ply may be a steel belt or a corded ply. The corded ply may be nylon or other polymeric cords encased in a rubber skim layer.

A plurality of spaced apart reinforcing layers 625 are disposed about the single reinforcement ply 620. A tread layer 630 is disposed about the spaced apart reinforcing layers 625, thereby forming a plurality of ribs spaced apart by circumferential grooves.

Figure 8:
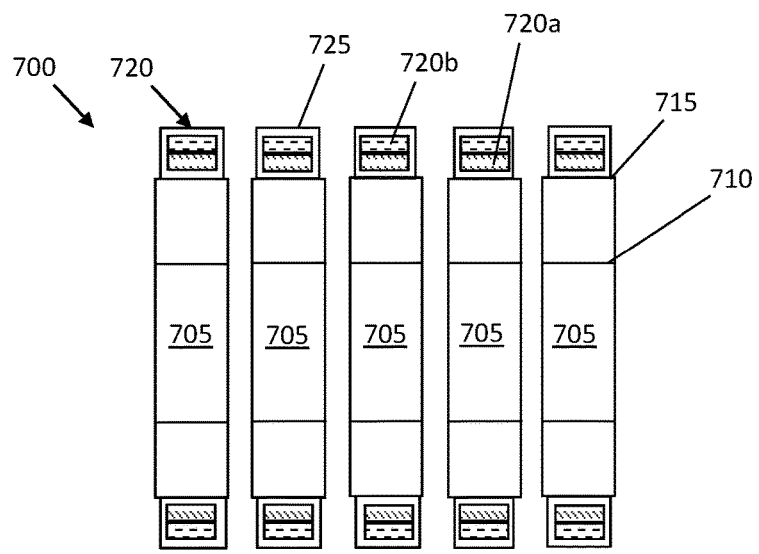
FIG. 8 is a schematic drawing illustrating a partially exploded cross-section of still another alternative embodiment of a nonpneumatic tire.

FIG. 8 is a schematic drawing illustrating a partially exploded cross-section of still another alternative embodiment of a nonpneumatic tire 700. The tire 700 is substantially the same as the tires 500 and 600 shown in FIGS. 6 and 7 and discussed above (including the alternative embodiments discussed above), except for the differences described herein.

In the illustrated embodiment, the nonpneumatic tire 700 includes a plurality of spoke rings 705. In an alternative embodiment, a webbing or other support structure is used instead of spoke rings. The spoke rings 705 extend from an annular inner surface 710 to an annular outer surface 715. The tire 700 does not include any reinforcement plies. Instead, a plurality of spaced apart reinforcing layers 720 are disposed on the outer annular surfaces 715 of the spoke rings 705.

In the illustrated embodiment, each reinforcing layer 720, is composed of two sub-layers. A first sub-layer 720a is disposed immediately radially above the outer annular surface 715 of a corresponding spoke ring 705. A second sublayer 720b is disposed immediately radially above the first sub-layer 720a and radially below a tread rubber 725.

While the two sub-layers are shown as having approximately the same gauges and same widths, the two sub-layers may have different gauges or different widths. The two sub-layers may have various combination of their materials or properties. For example, in the case that both of the sub-layers 720a,b include reinforcing cords embedded in matrix rubbers, two sub-layers may have different reinforcing cord materials, different cord properties and/or different matrix rubbers. Only one of the sub-layers may include a reinforcing cords embedded in matrix rubber. In an alternative embodiment (not shown), a reinforcing layer includes three or more sub-layers.

The spoke rings and webbing disclosed in the embodiments of FIGS. 1-8 may cause the nonpneumatic tire 100, 200, 300, 400, 500, 600, 700 to form a rounded contact patch shape when in contact with the ground. The rounded contact patch shape reduces the effects of road impact and noise. The curvature of the rounded contact patch shape can be determined by various factors, including, without limitation, each spoke ring's stiffness, outer diameter, thickness, spoke geometry, number of spokes, shape and number of openings, and the number of spoke rings included in the nonpneumatic tire. By varying these parameters, the nonpneumatic tire may be adapted to suit a wide range of applications, including agricultural applications and passenger vehicle applications. For example, in some applications such as use in agricultural vehicles, uniform contact pressure and maximized contact area may be desired. A nonpneumatic tire with a rounded contact patch shape (or rounded band) can be designed to deflect more at low loads maximizing contact area and minimizing soil compaction. A nonpneumatic tire with flat contact patch shape loses the ability to deflect in the radial direction at different rates across its axial width which will cause less deflection, and less contact patch area, especially at light load conditions. A nonpneumatic tire with a rounded contact patch shape will result in superior (reduced) soil compaction performance and superior (reduced) ride harshness for the driver/operator.

Figure 9:
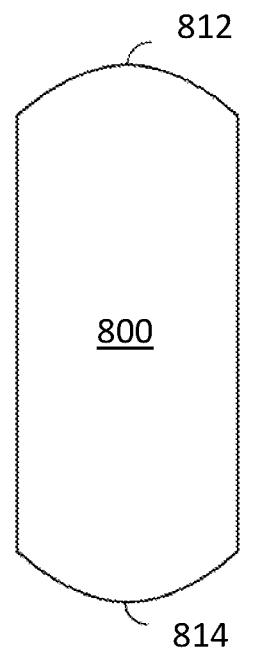
FIG. 9 is a schematic drawing illustrating an exemplary rounded contact patch shape made by a nonpneumatic tire, where the contact patch shape has a rounded leading edge and a rounded trailing edge.

FIG. 9 depicts an exemplary elongated rounded contact patch shape 800 which is formed when one of the nonpneumatic tires 100, 200, 300, 400, 500, 600, 700 is in contact with a rolling surface in a load bearing condition. Elongated rounded contact patch shape 800 includes a rounded leading edge 812 and a rounded trailing edge 814. The axial stiffness distribution or varying axial diameter of the nonpneumatic tires 100, 200, 300, 400, 500, 600, 700 contribute to the forming of rounded edges 812 and 814.

Figure 10:
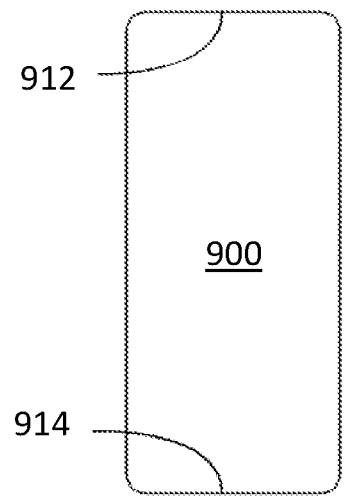
FIG. 10 is a schematic drawing illustrating an exemplary contact patch shape of a prior art tire, where the footprint has a flat leading edge and a flat trailing edge.

By contrast, FIG. 10 depicts a contact patch shape 900 of a prior art airless tire (not shown). The contact patch shape 900 includes straight leading and trailing edges 912, 914. A nonpneumatic tire making a flat contact patch shape 900 results in greater ride vibration and noise than a nonpneumatic tire making a rounded contact patch shape 800.

Figure 11:
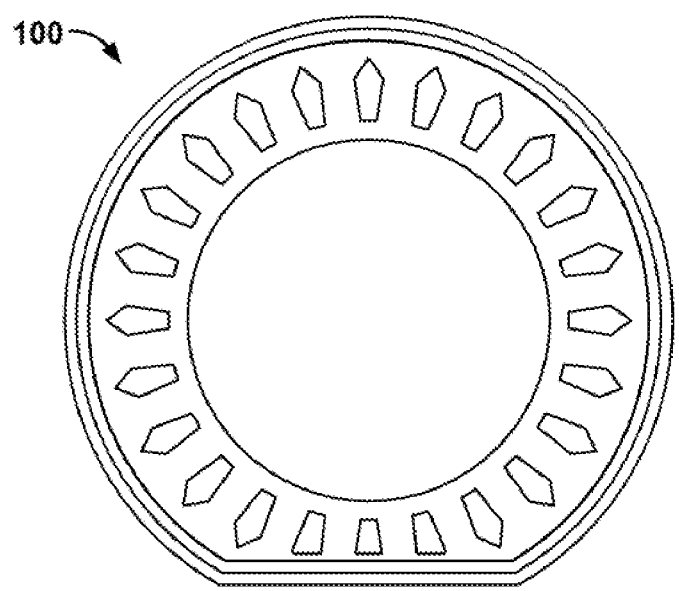
FIG. 11 is a schematic drawing illustrating a side view of the nonpneumatic tire 100 bearing a load.

The contact patch shape is formed when the nonpneumatic tire is in contact with a rolling surface in a load bearing condition. As one example, FIG. 11 is a schematic drawing depicting a side view of the nonpneumatic tire 100 of FIGS. 1 and 2 bearing a load. In one embodiment, the effects of using variable stiffness rings in axial alignment can be enhanced based on the load distribution within the nonpneumatic tire. The load carrying distribution in such an embodiment can rely more heavily on load transmitted in compression through the spokes at the bottom of the tire (between the load and the ground surface), and less on the shear band to transfer load to the top of the tire. In some NPTs the load is carried primarily through the use of a cylindrical shear band with spokes that buckle at the bottom of the tire. These NPTs are considered "top loaders" and carry most of the load through the shear band and the upper spokes in tension. Other NPTs are essentially rigid (or semi-flexible) structures that carry a majority of the load through the bottom portion, "bottom loaders." In one embodiment, the load is relatively balanced between the spoke rings and shear band such that approximately 50% of the load is carried through the bottom spokes in compression and approximately 50% of the load is carried through the shear band and upper spokes in tension. This approximate 50/50 load distribution allows for varying the diameters and stiffness of the spoke rings to create a desired contact patch shape. In this embodiment, the spokes 112 undergoing a compressive force do not buckle when nonpneumatic tire 100 is loaded.

The nonpneumatic tire 100 creates a rounded contact patch shape 800 on a rolling surface when a load is placed on nonpneumatic tire 100. Rounded leading edge 812 is formed when nonpneumatic tire 100 undergoes a loading force. Rounded leading edge 812 result in reduced ride vibration and noise by allowing the tire to pass over bumps in the road more softly than a nonpneumatic tire with a straight leading edge.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A nonpneumatic tire comprising:
   a plurality of spoke rings, each of the plurality of spoke rings including:
      an annular outer surface,
      an annular inner surface, and
      a plurality of spokes extending between the annular outer surface and the annular inner surface;
   a plurality of shear elements, each shear element corresponding to one of the plurality of spoke rings,
      wherein each shear element extends circumferentially around the annular outer surface of a corresponding spoke ring,
      wherein each shear element includes a single layer of substantially inelastic material that is wrapped around an elastic central region; and
   a tread layer extending circumferentially around the plurality of shear elements,
      wherein each of the plurality of shear elements is disposed in one of a plurality of ribs in the tread layer, and
      wherein no part of the shear elements forms a wall surface of any of the plurality of ribs.

2. The nonpneumatic tire of claim 1, wherein the plurality of shear elements are spaced apart from each other.

3. The nonpneumatic tire of claim 1, wherein the plurality of spoke rings are chemically bonded to each other.

4. The nonpneumatic tire of claim 1, wherein the plurality of spoke rings are spaced apart from each other.

5. The nonpneumatic tire of claim 1, wherein at least one of the plurality of spokes extends from an annular inner surface of a first spoke ring to an annular outer surface of a second spoke ring.

6. The nonpneumatic tire of claim 1, wherein each shear element has a width that is less than a width of the corresponding spoke ring.

7. The nonpneumatic tire of claim 1, wherein the elastic central region includes an upper elastic region and a lower elastic region separated by a substantially inelastic central region.

8. A nonpneumatic tire, comprising:
   an annular outer surface;
   an annular inner surface;
   a webbing extending from the annular outer surface to the annular inner surface;
   a plurality of shear elements extending circumferentially around the annular outer surface and spaced laterally apart from each other,
      wherein each shear element includes a single layer of substantially inelastic material that is wrapped around an elastic central region; and
   a tread layer extending circumferentially around the plurality of shear elements,
      wherein the tread layer includes a plurality of ribs separated by a plurality of grooves,
      wherein each of the plurality of shear elements is disposed in one of the plurality of ribs in the tread layer, and
      wherein no part of the shear elements forms a groove wall surface of any of the plurality of circumferential grooves.

9. The nonpneumatic tire of claim 8, wherein the annular outer surface includes a plurality of spaced apart annular outer surfaces.

10. The nonpneumatic tire of claim 9, wherein the webbing extends between the spaced apart annular outer surfaces.

11. The nonpneumatic tire of claim 9, wherein the webbing includes a series of spaced apart webbing layers corresponding to the spaced apart annular outer surfaces.

12. The nonpneumatic tire of claim 8, wherein the tread layer includes a plurality of spaced apart tread layers corresponding to the plurality of shear elements.

13. A nonpneumatic tire comprising:
an annular outer surface;
an annular inner surface;
support structure extending from the annular outer surface to the annular inner surface; and
a circumferential tread having a plurality of circumferential ribs and a plurality of circumferential grooves, including a first circumferential rib having a first rib width defined by a first circumferential groove and a second circumferential groove,
wherein the first circumferential rib includes a shear element having a width less than the first rib width, such that the shear element is enclosed by the first circumferential rib,
wherein the shear element includes a single layer of substantially inelastic material that is wrapped around an elastic central region, and
wherein a top surface of the shear element is located radially above a bottom of the first circumferential groove and radially above a bottom of the second circumferential groove.

14. The nonpneumatic tire of claim 13, wherein the single layer of substantially inelastic material includes a plurality of reinforcing cords.

15. The nonpneumatic tire of claim 13, wherein the support structure includes a plurality of spokes.

16. The nonpneumatic tire of claim 13, wherein the support structure is a webbing.

* * * * *